United States Patent [19]

Wieland

[11] Patent Number: 5,039,931

[45] Date of Patent: Aug. 13, 1991

[54] 12 VOLT BATTERY CHARGER CIRCUIT

[75] Inventor: Thomas J. Wieland, Stillwater, Minn.

[73] Assignee: Onan Corporation, Minneapolis, Minn.

[21] Appl. No.: 416,872

[22] Filed: Oct. 4, 1989

[51] Int. Cl.$^5$ .............................................. H02J 7/10
[52] U.S. Cl. ........................................ 320/31; 320/32
[58] Field of Search .................... 320/DIG. 2, 31, 32; 322/94, 58, 32

[56] References Cited

U.S. PATENT DOCUMENTS

| | | | |
|---|---|---|---|
| 3,036,261 | 10/1960 | Grady, Jr. | 320/64 |
| 3,281,650 | 10/1966 | Rice | 322/25 |
| 3,382,425 | 5/1968 | Legatti | 320/32 |
| 3,445,745 | 5/1969 | Frezzolini | 320/29 |
| 3,559,026 | 1/1971 | Nolan et al. | 320/39 |
| 3,619,763 | 11/1971 | Wyles | 322/32 |
| 3,688,177 | 8/1972 | Reeves et al. | 320/39 X |
| 3,800,209 | 3/1974 | Minear | 320/25 |
| 4,052,656 | 10/1977 | Lavell et al. | 320/23 |
| 4,147,970 | 4/1979 | Okuda et al. | 320/21 |
| 4,268,787 | 5/1981 | Sloan | 322/94 X |
| 4,371,826 | 2/1983 | Shelly | 320/21 |
| 4,405,892 | 9/1983 | Staerzl | 322/94 X |
| 4,458,195 | 7/1984 | Piteo | 322/94 |
| 4,852,540 | 8/1989 | Safranek | 322/94 X |

Primary Examiner—R. J. Hickey
Attorney, Agent, or Firm—Merchant, Gould, Smith, Edell, Welter & Schmidt

[57] ABSTRACT

A circuit for charging a battery from a source of AC power. The disclosed circuit provides over voltage protection, reverse battery protection, current limiting, and over frequency protection. These protections are provided through the use of an SCR, a zener diode, a current sense resistor, a voltage reference, and several voltage comparators.

15 Claims, 3 Drawing Sheets

12 VOLT BATTERY CHARGER CIRCUIT

FIELD OF THE INVENTION

The present invention relates to an apparatus for charging batteries from an Alternating Current (AC) supply. More particularly, the present invention relates to a battery charger which provides over-voltage protection, current limiting protection, over-frequency protection, and reverse battery voltage protection.

BACKGROUND OF THE INVENTION

Techniques for charging batteries from a supply of AC current are known in the art. Also known are battery chargers which protect the battery being charged by shutting down in the event of an over-voltage condition, and protect the battery charger circuit from the battery in the event that the battery is inadvertently connected with reversed polarity. However, if a battery is defective or inadvertently shorted out, excess charging current may flow causing damage to the battery charging circuit. Thus it is desirable for a battery charger to be provided with protection against excess current flow.

One application for a battery charging circuit is for charging an automotive type battery in a motor vehicle. Typically, the vehicle engine will drive a generator or alternator which provides a source of AC power. A battery charging circuit may be employed to take the AC power from the generator or alternator and use it to charge the battery. One problem encountered when used in this environment is due to the fact that the alternator or generator is driven by an engine which varies in speed. An increase in engine speed can result in the generated voltage increasing, and the frequency of the generator output increasing. Depending upon the design of the charging circuit, increased frequency can cause damage to certain components which must switch high power levels at the input frequency. An increased frequency is also evidence that the voltage of the input may be too high, which could result in damage to the charging circuit.

While it is possible to add any number of additional protection means to existing battery chargers, the addition of each such protection circuit requires additional complexity to the battery charger with a corresponding increase in the number of components. The addition of components increases the amount of physical space the circuit requires, and also reduces the reliability of the circuit. Thus it is desirable for a battery charging circuit to be of a simple design using relatively few components.

It is clear that there has existed a long and unfilled need in the prior art for a simple battery charging circuit which provides over-voltage protection, reverse battery polarity protection, current limiting protection, and over-frequency protection. The present invention solves these and other shortcomings of the techniques known in the prior art.

SUMMARY OF THE INVENTION

Accordingly, it is an object of the present invention to provide a means for charging a battery from a source of AC power, and specifically for providing protection against over-voltage, excess current, overfrequency, and reverse battery polarity. It is also an object of the present invention to provide these features in a single circuit requiring relatively few components.

In order to achieve the foregoing objects, an apparatus is disclosed for charging a battery, comprising a switching means for rectifying an input AC signal and passing the rectified AC output signal to a battery when the switching means is in an on state, and for blocking output when in an off state; over-voltage control means responsive to the voltage of the output signal, for shutting off the switching means when voltage exceeds a pre-determined value; current limiting control means responsive to the current of the output signal, for shutting off the switching means when the current of the output signal exceeds a pre-determined value; and output means for connecting the output signal to a battery to be charged.

These and various other advantages and features of novelty which characterize the invention are pointed out with particularity in the annexed claims which form a part of this disclosure. However, for a better understanding of the invention, its advantages, and the objects obtained by its use, reference should be made to the drawings which also form a part of this disclosure, and to the accompanying descriptive matter in which there is illustrated and described a preferred embodiment of the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
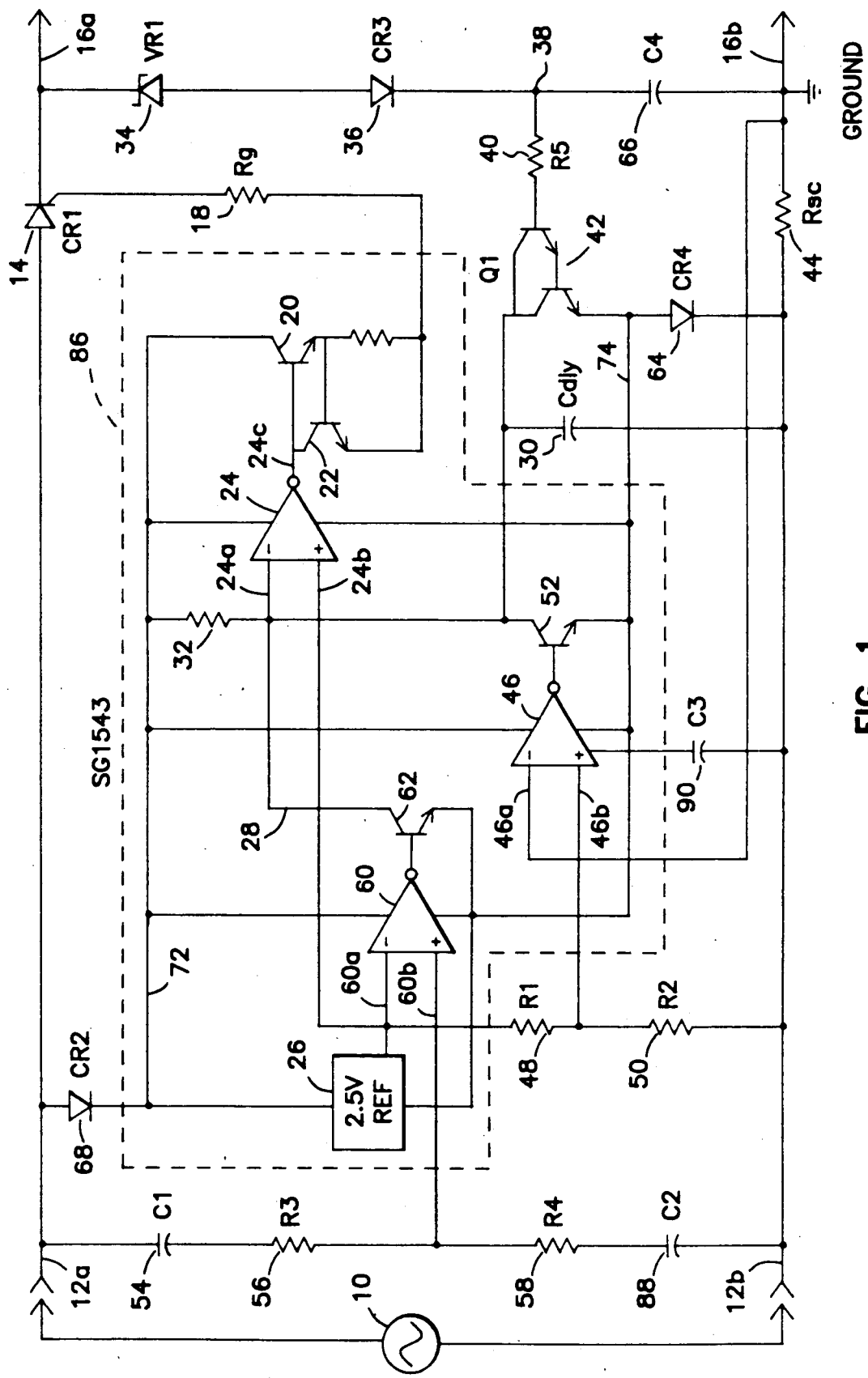
FIG. 1 shows a circuit diagram of a battery charger according to one embodiment of the present invention.

With reference to the drawings, and particularly to FIG. 1, a circuit diagram of a preferred embodiment of a battery charger is shown. An external source of AC such as an automotive generator 10 is connected to the battery charging circuit at 12a and 12b. A Silicon Controlled Rectifier (SCR) 14 gates power from the input 12a to the output 16, where a battery to be charged is connected. Since current travels through SCR 14 in only one direction, half-wave rectified AC will be provided to the battery terminal 16a. An SCR is a gated device and thus current is allowed to flow only when the SCR has been switched to an on state by the presence of current in its gate lead. SCR 14 is turned on by current provided through current limiting resistor 18 from transistors 20 and 22, which in turn are controlled by voltage comparator 24. Thus is provided a means for determining electronically whether the battery to be charged will receive a charging current or not.

Voltage comparator 24 has a '−' input 24a, a '+' input 24b, and an output 24c. The voltage at the output 24c is determined by comparing the voltages on the two inputs 24a and 24b. If the voltage on the '+' input 24b exceeds the voltage on the '−' input 24a, then the output 24c will be a low voltage. A low voltage on the output 24c will turn transistors 20 and 22 off, resulting in SCR 14 being switched to an off state. The '+' input 24b is connected to a 2.5 volt voltage reference 26, and the '—' input 24a is connected to node 28. Thus, whether the SCR 14 will be in an on state or an off state is determined by the voltage on node 28. If the voltage at node 28 exceeds 2.5 volts, SCR 14 will be on allowing a charging current to reach the battery to be charged. If the voltage on node 28 is less than 2.5 volts, SCR 14 will be off preventing charging current from reaching the battery. Node 28 is normally held at a high voltage level due to capacitor 30 being charged by a current source, shown here as resistor 32. There are three control means connected to node 28 which are capable of bringing the node voltage to a low level and thereby turning off SCR 14. Each of these will be discussed in turn.

If the voltage provided to the battery being charged is excessive, it is possible to damage the battery. To avoid this, the battery charging circuit is provided with means for detecting an over-voltage condition and turning off SCR 14. When an over-voltage condition exists at the output 16a and 16b, zener diode 34 breaks down allowing current flow in the reverse bias direction, and allowing diode 36 to conduct as well. This causes the voltage at node 38 to be high, inducing a current through resistor 40 which biases transistor pair 42. When transistor pair 42 turns on, node 28 is brought to a low voltage level thus turning off SCR 14 and shutting down charging current to the battery.

It is also desirable to shut down the battery charger if too much current is being drawn. To this end, a current sense resistor 44 is provided in one lead of the battery connection. This resistor is connected to voltage comparator 46 at its '—' lead 46a, while the '+' lead 46b is connected to a reference voltage determined by a voltage divider made up of resistors 48 and 50, connected to voltage reference 26. The values of the current sense resistor 44 and the voltage divider resistors 48 and 50 are dependant upon several factors, including the anticipated current draw of the battery and the current level at which it is desired to shut down charging current to the battery. The battery charging current develops a voltage across the current sense resistor 44, which is compared by comparator 46 to the voltage provided by the voltage divider resistors 48 and 50. If the voltage on 46a exceeds the voltage on 46b, the output of voltage comparator 46 goes high which turns on transistor 52. If transistor 52 is on, then node 28 will be brought to a low voltage, resulting in SCR 14 and charging current to the battery being turned off. One skilled in the art will easily be able to select appropriate values for the current sense resistor 44 and the voltage divider resistors 48 and 50 once the specific application has been determined.

One application for the present invention is as a battery charging circuit for use in a motor vehicle for charging an automotive type battery. Power for the battery charging circuit typically comes from a generator which is driven by the vehicle's engine. An increase in engine speed can result in an increase in the output voltage from the generator, and an increase in the frequency of the output from the generator. An increase in frequency might cause SCR 14 to fail due to its inability to switch high power levels at a increased frequency. Thus it is desirable to shut down the battery charger if the input frequency exceeds a specific amount. An input signal is coupled from input pin 12a through capacitor 54 into a voltage divider made up of resistors 56 and 58, which scales the voltage to an appropriate level. From the voltage divider, the signal is connected to the '+' lead 60b of comparator 60. The '—' lead 60a is connected to the voltage reference 26. If the voltage on 60b is less than the reference voltage on 60a, the output of voltage comparator 60 goes high which turns on transistor 62. This in turn brings node 28 to a low voltage resulting in SCR 14 and charging current to the battery being turned off.

The input signal is a source of alternating current, and resistors 56 and 58 are chosen so as to scale the input signals such that its maximum and minimum voltage levels straddle that of voltage reference 26. This causes voltage comparator 60 to output negative going pulses when the sample input on pin 60b exceeds the voltage from the voltage reference 26. These pulses in turn cause transistor 62 to pulse node 28 and thus SCR 14 and the charging current to the battery. Operation of the overfrequency protection circuit will be more fully explained later in reference to FIG. 2.

The embodiment of FIG. 1 also includes reverse voltage protection circuitry which provides protection of the battery charger circuit in the event that the battery is inadvertently connected with reversed polarity. If the '+' lead of a battery is connected to output 16b, diode 64 prevents current from flowing into the emitters of the transistor pair 42, transistors 52 and 62, and the ground reference of the voltage reference 26. Additionally, capacitor 66 prevents Direct Current (DC) from the battery from reaching the base of transistor pair 42 through resistor 40. Reverse battery current in any of these paths could result in damage to the charger circuit. By blocking these paths, the circuit is effectively protected against the possibility of a reversed battery.

The battery charger circuit of FIG. 1 is powered by the external AC source 10. Diode 68 is a half-wave rectifier which provides a '+' node 72 and a '—' node 74 for powering the comparators 24, 46 and 60, the voltage reference 26, and the related circuitry.

Figure 2:
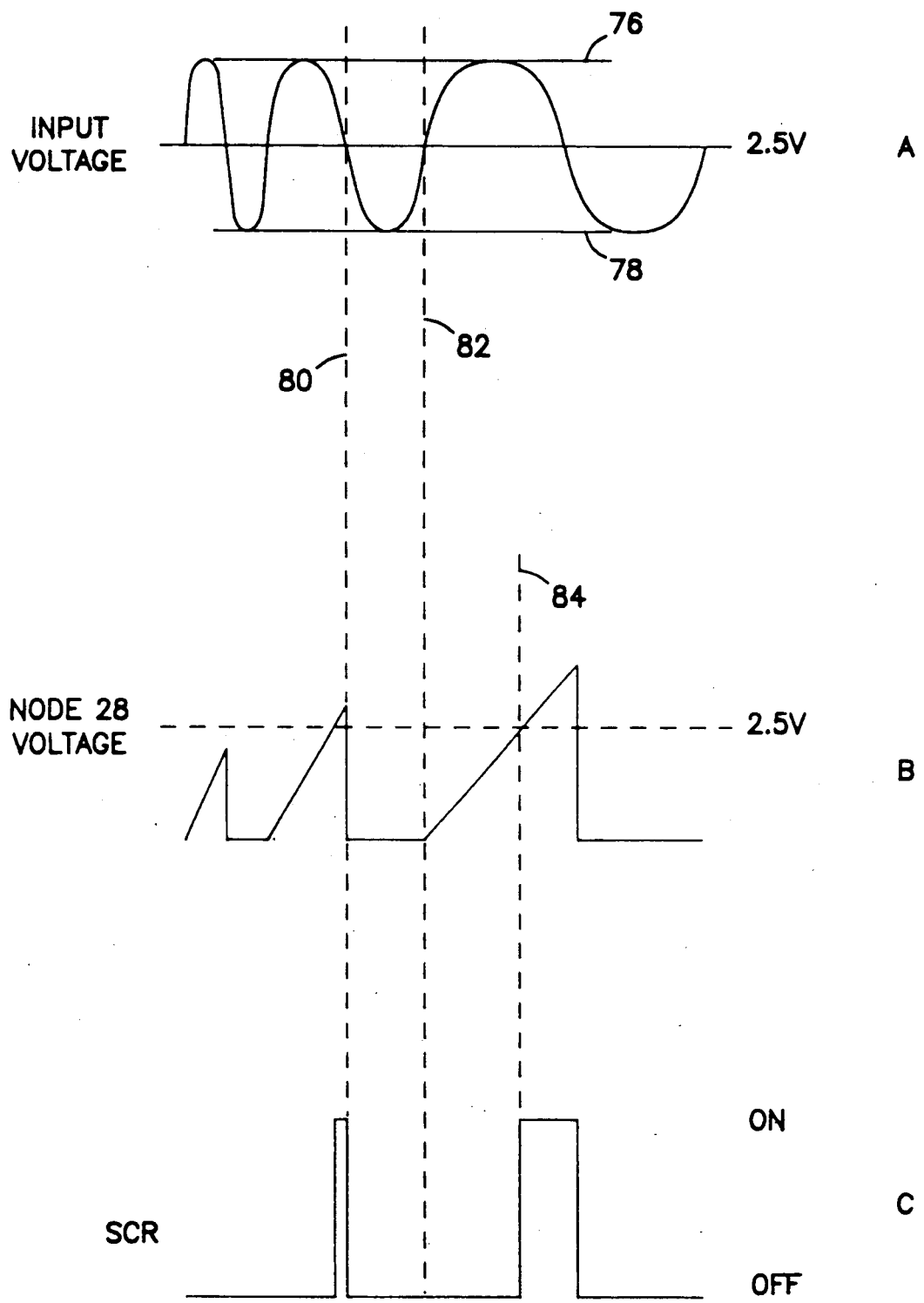
FIG. 2 shows waveforms of the operation of an over-frequency protection circuit according to an embodiment of the present invention.

Referring now to FIG. 2, waveforms of the operation of the over-frequency protection circuit of FIG. 1 are shown. Trace A shows an input signal of varying frequency. The upper voltage level 76 is greater than 2.5 volts, and the lower voltage level 78 is less than 2.5 volts. When this input signal goes below 2.5 volts, transistor 62 conducts bringing node 28 to a low voltage as is shown in trace B at 80. If node 28 is low, SCR 14 is turned off as is shown in trace C. When the input signal exceeds the 2.5 volt reference as is shown at 82, transistor 62 turns off releasing node 28. Capacitor 30 is then allowed to charged through resistor 32. The voltage on node 28 will ramp upward at a rate determined by values of capacitor 30 and resistor 32. How long capacitor 30 is allowed to charge is determined by the period (and thus the frequency) of the input signal, and if sufficiently long, the voltage on node 28 will exceed the 2.5 volt reference 26 as shown at 84. This will cause comparator 24 to switch states and will also turn on SCR 14 as described previously. SCR 14 will stay on until node 28 is again brought to a low voltage by the input signal dropping below 2.5 volts.

Figure 3:
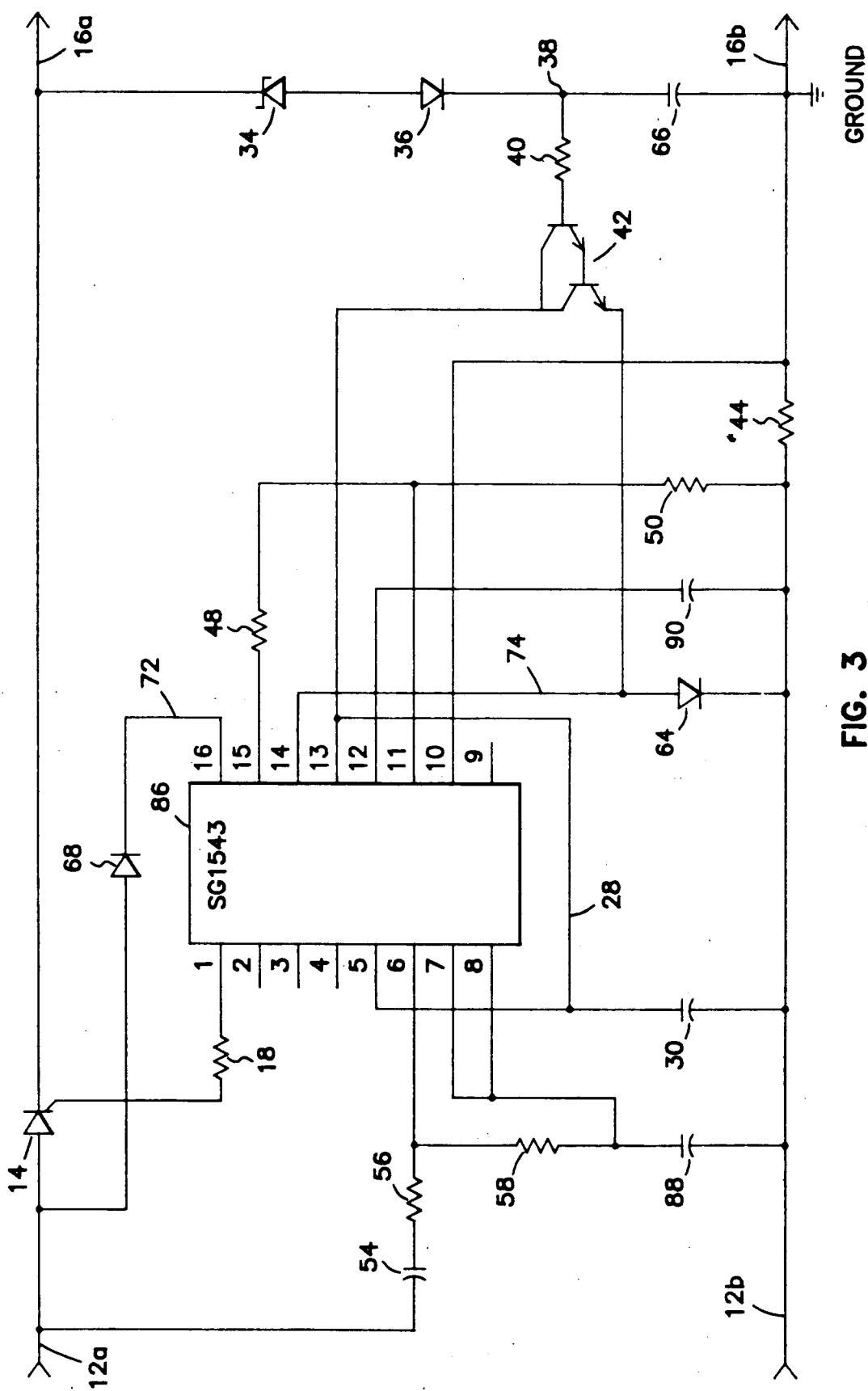
FIG. 3 shows a circuit diagram of a battery charger according to an alternate embodiment of the present invention.

Referring now to FIG. 3, a circuit diagram of a preferred embodiment of a battery charger is shown. Much of the circuitry is contained within integrated circuit (IC) 86, including the voltage reference 26, voltage comparators 24, 46 and 60, and transistors 20, 22, 52 and 62. Capacitor 88 AC couples the input divider resistors 56 and 58 to ground. Capacitor 90 provides a delay in the over current shutdown circuit of comparator 46. The value of capacitor 90 determines how long an over current condition exists before comparator 46 shuts down the battery charger. The desired capacitor value for a given delay can be easily determined with minimal experimentation.

The battery charger circuit of FIG. 3 can be used for charging a 12 volt automotive storage battery from a generator or alternator, typically providing an AC voltage less than or equal to 18 volts RMS. For use in this manner, the following component values are suggested:

| Component | Value |
| --- | --- |
| Resistor 18 | 75 Ω |
| Resistor 40 | 10K Ω |
| Resistor 44 | .01 Ω |
| Resistor 48 | 10K Ω |
| Resistor 50 | 200 Ω |
| Resistor 56 | 10K Ω |
| Resistor 58 | 10K Ω |
| Capacitor 30 | 0.1 μF |
| Capacitor 54 | 1.0 μF |
| Capacitor 66 | 0.1 μF |
| Capacitor 88 | 0.1 μF |
| Capacitor 90 | 1.0 μF |
| Zener Diode 34 | 12 v |

Those skilled in the art will recognize that other applications of the present invention may require different component values. For example, if different charging currents are required, then the component values that govern overvoltage protection and current limiting will have to change appropriately.

The break down voltage of zener diode 34 is calculated by first selecting a maximum output voltage for the battery charger. This will be determined by the type of battery being charged, and is often approximately 10% greater than the voltage of the battery. Ignoring the voltage drop across current sense resistor 44, the voltage appearing between the '+' battery terminal 16a and the cathode of diode 64 will be approximately equal to the voltage appearing across the battery. If a 14–15 volt maximum battery voltage is selected, 0.7 volts of which appears across diode 64, 0.7 volts of which appears across diode 36, and one volt of which appears across transistor pair 42, approximately 12 volts is left for zener diode 34. Thus a 12 volt zener diode is selected.

The value of current sense resistor 44 is determined by a number of factors, including the anticipated current draw of the battery during charging and the voltage of voltage reference 26. If the value of current sense resistor 44 is too large, the amount of current the battery charger will be able to provide to the battery will be reduced, resulting in less efficient operation. If the value of current sense resistor 44 is too small, the voltage developed across it by the charging current is too small to be easily compared with voltage reference 26. In the shown embodiments, this voltage is compared to the output of a voltage divider made up of resistors 48 and 50 fed by voltage reference 26. This voltage divider output is approximately 0.049 volts if voltage reference 26 produces 2.5 volts, and resistor 48 is 10K Ω and resistor 50 is 200 Ω. Resistor 44 has been chosen so that the voltage across it equals 0.049 volts when the desired maximum current is being drawn. With a desired shutdown current of approximately 5 amps, resistor 44 is selected to be 0.01 ohms.

Resistors 56 and 58 are chosen so as to provide a 1 volt P-P signal at pin 6 of IC 86. The frequency above which the battery charger will no longer supply charging current to the battery is determined by the value of capacitor 30. If the frequency of the input AC is less than $1/(20,000 \times C30)$, then the charging current will be allowed to pass through the battery. In the shown embodiments, capacitor 30 is 0.1 μF, so current from the battery charger to the battery will be cut off when the frequency reaches 500 Hz.

It is to be understood that even though numerous characteristics and advantages of various embodiments of the present invention have been set forth in the foregoing description, this disclosure is illustrative only and changes may be made in detail to the full extent indicated by the broad general meaning of the terms in which appended claims are expressed.

What is claimed is:

1. A circuit, comprising:
   (a) input means for receiving an input AC signal;
   (b) switching means connected to said input means for rectifying said input AC signal and providing a rectified AC output signal when said switching means is in an on state, and for blocking said output signal to when said switching means is in an off state;
   (c) over-voltage control means responsive to the voltage of said output signal, for shutting off said switching means when the voltage of said output signal is in excess of a predetermined value;
   (d) current limiting control means responsive to the current of said output signal, for shutting off said switching means when the current of said output signal exceeds a predetermined value;
   (e) over-frequency control means responsive to the frequency of said input AC signal, for shutting down said switching means when the frequency of said input signal exceeds a predetermined value; and
   (f) output means for electrically connecting said output signal to an external device.

2. A circuit according to claim 1, further comprising reverse voltage protection means for blocking current flow from said external device into said circuit.

3. A circuit according to claim 2, wherein said reverse voltage protection means includes a diode connected to said control means and said output means which blocks current flow from said external devices into said circuit.

4. A battery charger, comprising:
   (a) input means for receiving an input AC signal;
   (b) an SCR connected to said input means providing a half-wave rectified AC output signal to a battery to be charged when said SCR is in an on state, and for blocking said output signal when said SCR is in an off state; (c) over-voltage control means responsive to the voltage of said output signal and connected to said SCR, comprising a zener diode, a transistor connected to said zener diode, and a first voltage comparator connected to said transistor, and wherein said zener diode conducts when said output signal exceeds a predetermined voltage level, causing said transistor to conduct which causes said first voltage comparator to shut off said SCR; and
   (d) current limiting control means responsive to the current of said output signal, comprising a resistor connecting said output signal to a battery to be charged, a voltage reference, and a second voltage comparator connected to said voltage reference and said resistor, and wherein said second voltage comparator shuts said SCR off when the voltage on said resistor exceeds the voltage on said voltage reference.

5. A battery charger according to claim 4, further comprising over-frequency control means including a capacitor, a resistor, and a third voltage comparator, wherein said capacitor and said resistor are connected in series and connected across said input AC signal so as to produce a voltage across said resistor responsive to the frequency of said input AC signal, and wherein said voltage is connected to said third voltage comparator for shutting off said switching means when said voltage exceeds a predetermined value as a result of the frequency of said input signal exceeding predetermined value.

6. A battery charger according to claim 4, further comprising reverse voltage protection means for blocking current flow through a battery reversely connected to said output means into said battery charger.

7. A battery charger according to claim 5, further comprising reverse voltage protection means for blocking current flow through a battery reversely connected to said output means into said battery charger.

8. A battery charger, comprising:
  (a) input means for receiving an input AC signal;
  (b) an SCR connected to said input means providing a halfwave rectified AC output signal to a battery to be charged when said SCR is in an on state, and for blocking said output signal when said SCR is in an off state;
  (c) output means for electrically connecting said output signal to a battery to be charged;
  (d) control means connected to said SCR for controlling the state of said SCR, comprising a plurality of voltage comparators, a voltage reference, and a plurality of driving transistors;
  (e) over-voltage sensing means connected to said output means and to said control means so as to turn said SCR off when the voltage at said output means exceeds a predetermined value; and
  (f) over-frequency sensing means connected to said input means and to said control means so as to turn said SCR off when the frequency at said input means exceeds a predetermined value.

9. A battery charger according to claim 8, further comprising a blocking diode for blocking current flow through a battery reversely connected to said output means into said battery charger.

10. A battery charger according to claim 8, wherein said over-frequency sensing means includes a capacitor and a first resistor connected in series and connected across said input means, wherein a first voltage is developed across said first resistor that reflects the frequency of said input AC signal, and wherein said first voltage is monitored by said control means so as to turn off said SCR if said first voltage exceeds a predetermined value.

11. A battery charger according to claim 8, further comprising a second resistor connected to said control means and to said output means, and through which said output signal flows, wherein a second voltage is developed across said second resistor that reflects the current of said output signal, and wherein said second voltage is monitored by said control means so as to turn off said SCR if said second voltage exceeds a predetermined value.

12. A battery charger according to claim 11, further comprising a blocking diode for blocking current flow through a battery reversely connected to said output means into said battery charger.

13. A battery charger according to claim 12, wherein said over-frequency sensing means includes a capacitor and a first resistor connected in series and connected across said input means, wherein a first voltage is developed across said first resistor that reflects the frequency of said input AC signal, and wherein said first voltage is monitored by said control means so as to turn off said SCR if said first voltage exceeds a predetermined value.

14. A battery charger, comprising:
  (a) input means for receiving an input AC signal;
  (b) an SCR connected to said input means providing a halfwave rectified AC output signal to a battery to be charged when said SCR is in an on state, and for blocking said output signal when said SCR is in an off state;
  (c) output means for electrically connecting said output signal to a battery to be charged;
  (d) control means connected to said SCR for controlling the state of said SCR, comprising a plurality of voltage comparators, a voltage reference, and a plurality of driving transistors;
  (e) over-voltage sensing means connected to said output means and to said control means so as to turn said SCR off when the voltage at said output means exceeds a predetermined value; and
  (f) a capacitor and a first resistor connected in series and connected across said input means, wherein a first voltage is developed across said first resistor that reflects the frequency of said input AC signal, and wherein said first voltage is monitored by said control means so as to turn off said SCR if said first voltage exceeds a predetermined value.

15. A battery charger, comprising:
  (a) input means for receiving an input AC signal;
  (b) an SCR connected to said input means providing a halfwave rectified AC output signal to a battery to be charged when said SCR is in an on state, and for blocking said output signal when said SCR is in an off state;
  (c) output means for electrically connecting said output signal to a battery to be charged;
  (d) control means connected to said SCR for controlling the state of said SCR, comprising a plurality of voltage comparators, a voltage reference, and a plurality of driving transistors;
  (e) over-voltage sensing means connected to said output means and to said control means so as to turn said SCR off when the voltage at said output means exceeds a predetermined value;
  (f) a capacitor and a first resistor connected in series and connected across said input means, wherein a first voltage is developed across said first resistor that reflects the frequency of said input AC signal, and wherein said first voltage is monitored by said control means so as to turn off said SCR if said first voltage exceeds a predetermined value;
  (g) a second resistor connected to said control means and to said output means, and through which said output signal flows, wherein a second voltage is developed across said second resistor that reflects the current of said output signal, and wherein said second voltage is monitored by said control means so as to turn off said SCR if said second voltage exceeds a predetermined value; and
  (h) a blocking diode for blocking current flow through a battery reversely connected to said output means into said battery charger.

* * * * *